United States Patent [19]

VanGerpen

[11] Patent Number: 5,109,707
[45] Date of Patent: May 5, 1992

[54] C-BEAM FORCE SENSOR

[75] Inventor: Harlan W. VanGerpen, Cedar Falls, Iowa

[73] Assignee: Deere & Company, Moline, Ill.

[21] Appl. No.: 611,629

[22] Filed: Nov. 13, 1990

[51] Int. Cl.⁵ .......................... G01L 1/04; G01L 5/13
[52] U.S. Cl. ................................ 73/862.62; 73/862.57
[58] Field of Search ........... 73/862.56, 862.57, 862.62, 73/862.64, 780, 781; 172/7; 280/446.1

[56] References Cited

U.S. PATENT DOCUMENTS

| 2,332,136 | 10/1943 | Dillon | 73/862.62 |
|---|---|---|---|
| 2,520,923 | 9/1950 | Franzel et al. | |
| 2,962,893 | 12/1960 | Ormond | |
| 3,033,032 | 5/1962 | Glerum | 73/862.64 |
| 3,213,678 | 10/1965 | Abel | 73/781 |
| 3,995,696 | 12/1976 | Kainer et al. | 172/7 |
| 4,253,331 | 3/1981 | Unruh | |
| 4,271,910 | 6/1981 | Schafer | 172/7 |
| 4,386,533 | 6/1983 | Jackson et al. | 73/862.64 |
| 4,510,814 | 4/1985 | Santo | 73/862.57 |
| 4,640,368 | 2/1987 | Kittle et al. | 172/430 |

FOREIGN PATENT DOCUMENTS 0838539  6/1960  United Kingdom ............ 73/862.62

OTHER PUBLICATIONS

Deere & Co., "Rockshaft and Implement Hitches" pp. 70-15-17 to 70-15-20, 1977 and 1978.
Deere & Co. "Theory of Operation-Three Point Hitch Operation", Technical Manual (TM-1461), pp. 270-2-5-1 to 270-25-5, Jan. 1989.

*Primary Examiner*—Reinhard J. Eisenzopf
*Assistant Examiner*—Elizabeth L. Shopbell

[57] ABSTRACT

A draft force sensor includes a generally C-shaped member formed by a beam and a pair of lugs which both project to one side of the beam. Coupling holes are located in each lug and the centers of the holes are off-set from the centerline of the beam. One end of a flexible strap is fixed to one lug and the other end of the flexible strap is adjustably attached to the other lug. Alternatively, both ends of the flexible strap may be coupled to the lugs by adjustable support devices which are pivotally connected to the beam. The strap is curved and concave in a direction facing the beam and is biased to urge the supports and the lugs away from each other. A displacement transducer is mounted between the beam and the central portion of the strap. The displacement transducer senses the change of distance from the beam to the "arch" of the strap and generates an electrical signal indicative of the force on the ends of the C-shaped member.

2 Claims, 1 Drawing Sheet

C-BEAM FORCE SENSOR

BACKGROUND OF INVENTION

The present invention relates to a force sensor for sensing forces, such as the draft forces applied to the implement hitch of an agricultural tractor.

To provide draft control for agricultural tractors a means of measuring the draft force is required. In a production tractor draft control system with hydraulic draft sensing a pair of bell cranks were attached to opposite ends of a draft shaft. Draft links were coupled to one arm of each bell crank and a sensing cylinder was coupled between a part of the tractor frame and the second arm of one bell crank. With the advent of electronic draft control systems, the sensing cylinder was replaced with a load strap. This load strap had an opening into which was inserted a strain gauge type sensor. However, such strain gauge type sensors are expensive and the resulting sensor has limited sensitivity because of the rigidity of the load strap. Accordingly, a relatively simple, inexpensive and sensitive draft force sensing mechanism is desired.

SUMMARY OF INVENTION

One object of the present invention is to provide a simple, inexpensive and sensitive draft force sensor for an electronic draft control system.

Another object of the present invention is to provide such a sensor which utilizes a commercially available displacement transducer.

Another object is to provide such a sensor which can be used with standard hitch system components.

These and other objects are achieved by the present invention wherein a draft force sensor includes a generally C-shaped member formed by a beam and a pair of lugs which both project to one side of the beam. Coupling holes are located in each lug and the centers of the holes are off-set from the centerline of the beam. In one embodiment opposite ends of a flexible strap are coupled to each lug by adjustable supports. In another embodiment one end of the strap is fixed to one lug and the other end of the strap is adjustably coupled to other lug. In a no-load condition, the strap is curved and is concave in a direction facing the beam. A displacement transducer, such as a rectilinear potentiometer, linear variable transformer or other electrical device which is sensitive to displacement, is mounted between the beam and the central portion of the strap. The adjustable supports permit adjustment of the "arch" height in order to achieve a prescribed electrical signal at no-load during installation. The displacement transducer senses the change of distance from the beam to the "arch" of the strap and generates an electrical signal indicative of the force on the ends of the C-shaped member. This force sensor is then preferably coupled in the known manner between a bracket anchored to part of the tractor chassis or frame and an arm of the bell crank. The load from the draft link is thereby transmitted by pins to the holes in the lugs at each end of the C-shaped member. Since these holes are off-set from the centerline of the C-shaped member, the C-shaped member will bend and the flexible strap, installed with a predetermined "arch", acts as a mechanical amplifier as its mounted length is changed due to beam deflection, and the "arch" height is changed a greater amount than the mounted length change. The resulting draft sensor can sense both tension and compression.

DETAILED DESCRIPTION

Figure 1:
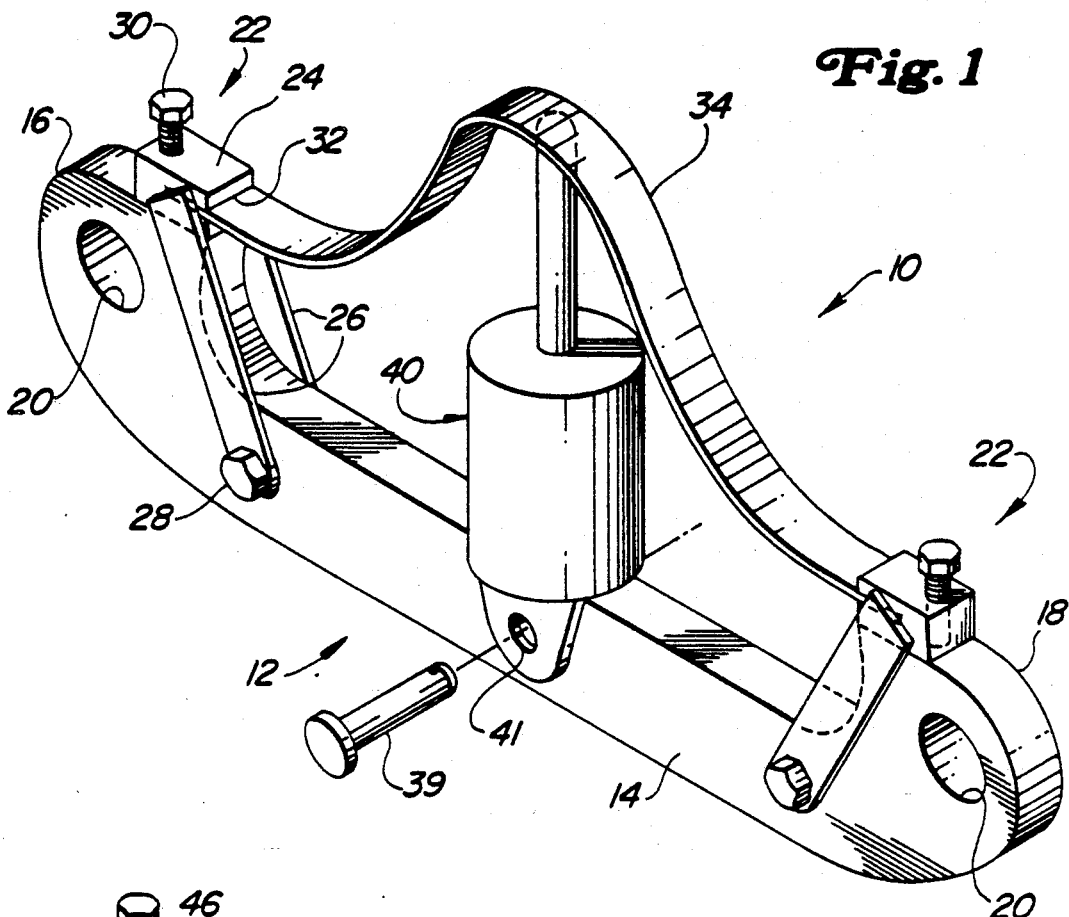
FIG. 1 is an isometric view of a draft sensor constructed according to the present invention.

The draft sensor 10 includes a generally C-shaped member 12 which is formed by a beam 14 and a pair of lugs 16,18 which project to one side of the beam 14 and from opposite ends of the beam 14. Each lug has a coupling aperture or hole 20. The axis of holes 20 is perpendicular to the surface of beam 14 and lugs 16,18 which is visible in the drawings.

Referring to FIG. 1, a pair of strap supports 22 are mounted near opposite ends of the beam 14. Each strap support 22 includes a box-shaped body 24 which is positioned adjacent a surface of one of the lugs 16,18. A pair of legs 26 are fixed (such as by welding) with respect to each body 24 and extend to ends which are pivotally connected to beam 14 by pins 28. An adjustment bolt 30 extends through a threaded bore in each body 24 and engages a surface of one of the lugs 16, 18. Each body 24 also includes a slot 32 which receives a respective end of a strap 34.

A line connecting the centers of holes 20 is spaced apart from and generally parallel to the beam 14, and is located between the strap 34 and the beam 14. The strap 34 is substantially thinner, and thus more flexible than the beam 14. The strap has a curved shape and is concave in a direction facing the beam 14. When installed between the supports 22, the strap 34 is biassed to urge the supports 22 away from each other.

A low cost commercially available displacement transducer 40 is positioned between the beam 14 and the central part of the strap 34 to sense changes in separation between the beam 14 and the central part of the strap 34 resulting from changes in the forces transmitted to the sensor 10. The transducer 40 may be a rectilinear potentiometer, a linear variable transformer or other electrical device which is sensitive to displacement. Preferably, the transducer 40 is pivotally coupled to a central part of the beam 14 by means of a pin 39 which is received in a bore 41 in the beam 14.

Draft forces are preferably communicated to the draft sensor 10 by means of pins (not shown) which are received by the holes 20. Since the holes 20 are off-set from the centerline of the beam 14, the beam 14 will bend and the central portion of the flexible strap 34 will at the same time approach or recede from the beam as the distance between the strap mounting points is increased or decreased. Because the longitudinal length of the strap 34 is longer than its arch height, the amount of the arch height change is greater than the change of the distance between the ends of the strap 34, the strap functions as a mechanical amplifier. The bolts 30 can be turned to adjust the amount of "arch" in the strap 34 and to thereby adjust the output of the transducer 40, for example, to obtain a zero voltage output from transducer 40 when no force is applied to the C-shaped member 12.

Figure 2:
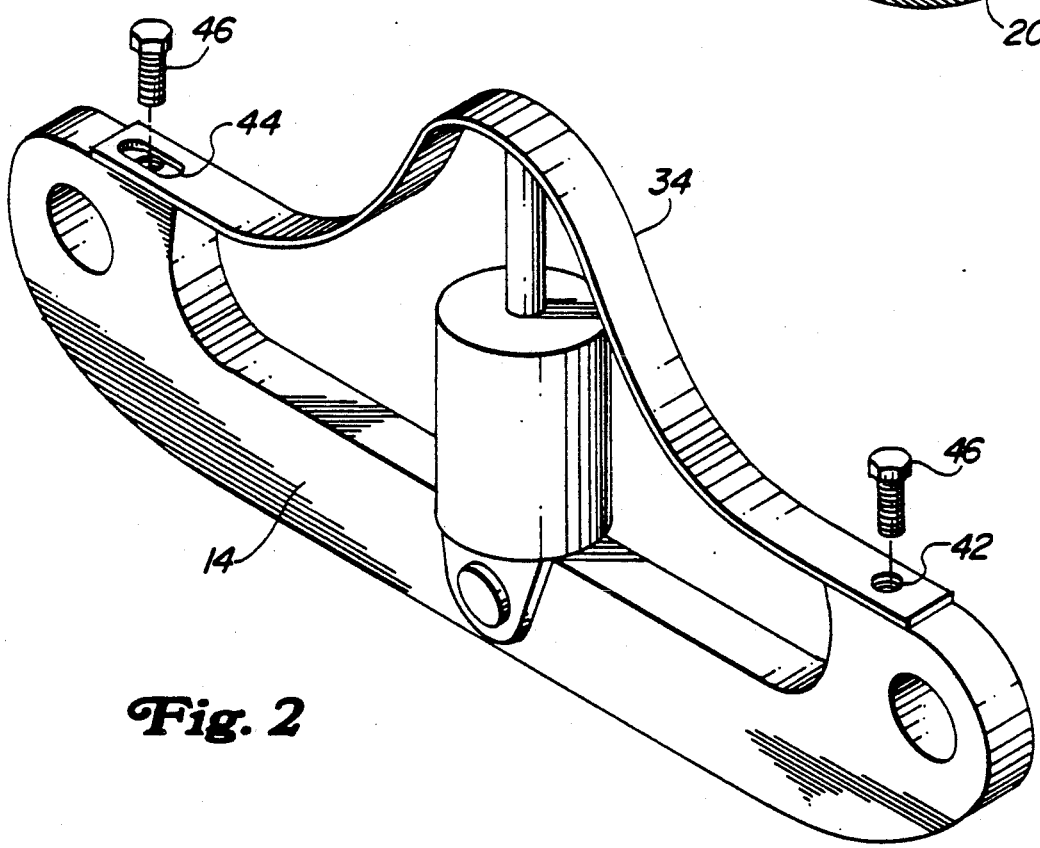
FIG. 2 is an isometric view of an alternate embodiment of a draft sensor constructed according to the present invention.

Referring now to FIG. 2, in an alternate embodiment the strap 34 has a clearance bolt hole 42 at one end and an elongated slot 44 at the other end. The strap 34 is attached to member 12 by means of bolts 46 which extend through the bolt hole 42 and the slot 44 and which are received in threaded bores in the member 12. The slot 44 permits adjustment of the arch height of the strap 34.

While the invention has been described in conjunction with a specific embodiment, it is to be understood that many alternatives, modifications, and variations will be apparent to those skilled in the art in light of the foregoing description. Accordingly, this invention is intended to embrace all such alternatives, modifications, and variations which fall within the spirit and scope of the appending claims.

I claim:

1. A force sensor for sensing forces tending to move one part towards and away from a second part, the force sensor comprising:
   a beam;
   a pair of lugs, each extending from a corresponding end of the beam, the lugs having coupler means for coupling each lug to one of the first and second parts, the coupler means beign spaced apart from and positioned on one side of the beam, the beam and the lugs forming a generally C-shaped member;
   a curved flexible strap, the strap being concave in a direction facing the beam and a line connecting the coupler means of the lugs being located between the strap and the beam;
   a first attachment means for attaching a first end of the strap to one of the lugs and a second attachment means for attaching a second end of the strap to the other of the lugs, the strap beign substantially more flexible than the C-shaped member and having a central portion which moves towards and away from the beam as the C-shaped member bends; and
   a displacement transducer for sensing changes in separation between the beam and the central portion of the strap.

2. A force sensor for sensing forces tending to move one part towards and away from a second part, the force sensor comprising:
   a beam;
   a pair of lugs, each extending from a corresponding end of the beam, the lugs having coupler means for coupling each lug to one of the first and second parts, the coupler means beign spaced apart from and positioned on one side of the beam, the beam and the lugs forming a generally C-shaped member;
   a curved flexible strap;
   a first attachment means for attaching a first end of the strap to one of the lugs and a second attachment means for attaching a second end of the strap to the other of the lugs, the strap being substantially more flexible than the C-shaped member and having a central portion which moves towards and away from the beam as the C-shaped member bends;
   each attachment means comprising a body having a slot therein for receiving an end of the strap, a pair of legs fixed to and projecting from the body, and means for pivotally connecting the legs to the beam; and
   a displacement transducer for sensing changes in separation between the beam and the central portion of the strap.

* * * * *